United States Patent
Lee et al.

(10) Patent No.: US 7,675,682 B2
(45) Date of Patent: Mar. 9, 2010

(54) OPTICAL FILM AND BACKLIGHT UNIT HAVING THE SAME

(75) Inventors: Seoungho Lee, Gimpo-si (KR); Junghoon Lee, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/972,486

(22) Filed: Jan. 10, 2008

(65) Prior Publication Data

US 2008/0252984 A1    Oct. 16, 2008

(30) Foreign Application Priority Data

Apr. 13, 2007    (KR) .................... 10-2007-0036643

(51) Int. Cl.
*G02B 27/10* (2006.01)

(52) U.S. Cl. .................................................. 359/625

(58) Field of Classification Search ................ 359/485, 359/494–500, 599, 619–625
See application file for complete search history.

(56) References Cited

U.S. PATENT DOCUMENTS

| | | | | |
|---|---|---|---|---|
| 5,771,328 A * | 6/1998 | Wortman et al. | ............. | 385/146 |
| 5,779,337 A * | 7/1998 | Saito et al. | ................... | 362/619 |
| 6,068,382 A * | 5/2000 | Fukui et al. | .................. | 362/625 |
| 6,354,709 B1 * | 3/2002 | Campbell et al. | ........... | 362/627 |
| 6,707,611 B2 * | 3/2004 | Gardiner et al. | ............. | 359/619 |
| 6,820,991 B2 * | 11/2004 | Wakaki et al. | ................ | 362/27 |
| 7,106,517 B2 * | 9/2006 | Olczak | ........................ | 359/599 |
| 7,142,767 B2 * | 11/2006 | Gardiner | ...................... | 385/146 |
| 7,180,690 B2 * | 2/2007 | Nagao | ......................... | 359/837 |
| 7,237,930 B2 * | 7/2007 | Onishi et al. | ................ | 362/333 |
| 7,246,933 B2 * | 7/2007 | Kunimochi | .................. | 362/620 |
| 7,252,427 B2 * | 8/2007 | Teng et al. | ................... | 362/626 |
| 7,278,771 B2 * | 10/2007 | Campbell | .................... | 362/606 |
| 7,278,772 B2 * | 10/2007 | Kunimochi | .................. | 362/619 |
| 7,384,173 B2 * | 6/2008 | Whitney | ...................... | 362/330 |
| 7,397,605 B2 * | 7/2008 | Mai | ............................ | 359/599 |
| 7,458,713 B2 * | 12/2008 | Onishi | ......................... | 362/626 |
| 2002/0057497 A1 * | 5/2002 | Gardiner et al. | ............. | 359/625 |
| 2003/0112521 A1 * | 6/2003 | Gardiner et al. | ............. | 359/619 |
| 2005/0059766 A1 * | 3/2005 | Jones et al. | .................. | 524/431 |
| 2005/0147374 A1 * | 7/2005 | Gardiner | ...................... | 385/146 |
| 2005/0151119 A1 * | 7/2005 | Jones et al. | ............... | 252/299.1 |
| 2006/0226583 A1 * | 10/2006 | Marushin et al. | ............ | 264/553 |

(Continued)

FOREIGN PATENT DOCUMENTS

JP    2007-218984 A    8/2007

(Continued)

OTHER PUBLICATIONS

Mar. 17, 2008 International Search Report.

*Primary Examiner*—Ricky L Mack
*Assistant Examiner*—Vipin M Patel
(74) *Attorney, Agent, or Firm*—Birch, Stewart, Kolasch & Birch, LLP (57) ABSTRACT

An optical film and a backlight unit having the same are disclosed. The optical film includes a base film and a first prism disposed on the base film, the first prism having a first peak height and a second prism disposed on the base film, the second prism having a second peak height. A difference between the first peak height and the second peak height is substantially 1 μm to 10 μm.

4 Claims, 7 Drawing Sheets

U.S. PATENT DOCUMENTS

| | | |
|---|---|---|
| 2007/0171654 A1 | 7/2007 | Etori |
| 2007/0183050 A1* | 8/2007 | Etori .......................... 359/582 |
| 2007/0195421 A1* | 8/2007 | Lin ............................ 359/619 |
| 2007/0229958 A1 | 10/2007 | Mai |
| 2007/0291371 A1* | 12/2007 | Lin ............................ 359/625 |
| 2008/0055937 A1* | 3/2008 | Chuang et al. .............. 362/627 |
| 2008/0088933 A1* | 4/2008 | Lin ............................ 359/599 |
| 2008/0303980 A1* | 12/2008 | Lor et al. ..................... 349/65 |

FOREIGN PATENT DOCUMENTS

| | | |
|---|---|---|
| KR | 1998-702614 A | 7/1998 |
| KR | 2001-0101834 A | 11/2001 |
| KR | 20-0364045 Y1 | 9/2004 |
| KR | 10-2005-0092257 A | 9/2005 |
| KR | 10-2007-0015390 A | 2/2007 |

\* cited by examiner

Fig. 1

RELATED ART

Fig. 2

RELATED ART

OPTICAL FILM AND BACKLIGHT UNIT HAVING THE SAME

This application claims the benefit of Korean Patent Application No. 10-2007-0036643 filed on Apr. 13, 2007, which is hereby incorporated by reference.

BACKGROUND OF THE DISCLOSURE

1. Field of the Disclosure

This document relates to an optical film and a backlight unit having the same.

2. Description of the Background Art

A liquid crystal display (LCD) is an electronic device that changes various electrical information generated from various elements to visual information by using a change in a liquid crystal transmission and transfers it.

The general LCD comprises a liquid crystal panel that displays an image according to a drive signal and a data signal applied from an external source and a backlight unit disposed on a rear surface of the liquid crystal panel in order to illuminate the liquid crystal panel.

The backlight unit comprises a light source unit, a reflection sheet, and an optical film.

The light source generates light of a certain wavelength.

The reflection sheet reflects light that has not been made incident on the optical film, among light generated from the light source, to allow the light to proceed in the direction of the liquid crystal panel.

The optical film comprises a diffusion sheet, a prism sheet, and a protection sheet.

Light outputted toward the liquid crystal panel after being generated from the light source passes through the diffusion sheet. At this time, the diffusion sheet distributes the incident light, preventing the light from concentrating partially and making luminance uniform.

As the light passes through the diffusion sheet, its luminance is sharply degraded, so in order to prevent the degradation of the luminance, the prism sheet is used.

Figure 1:
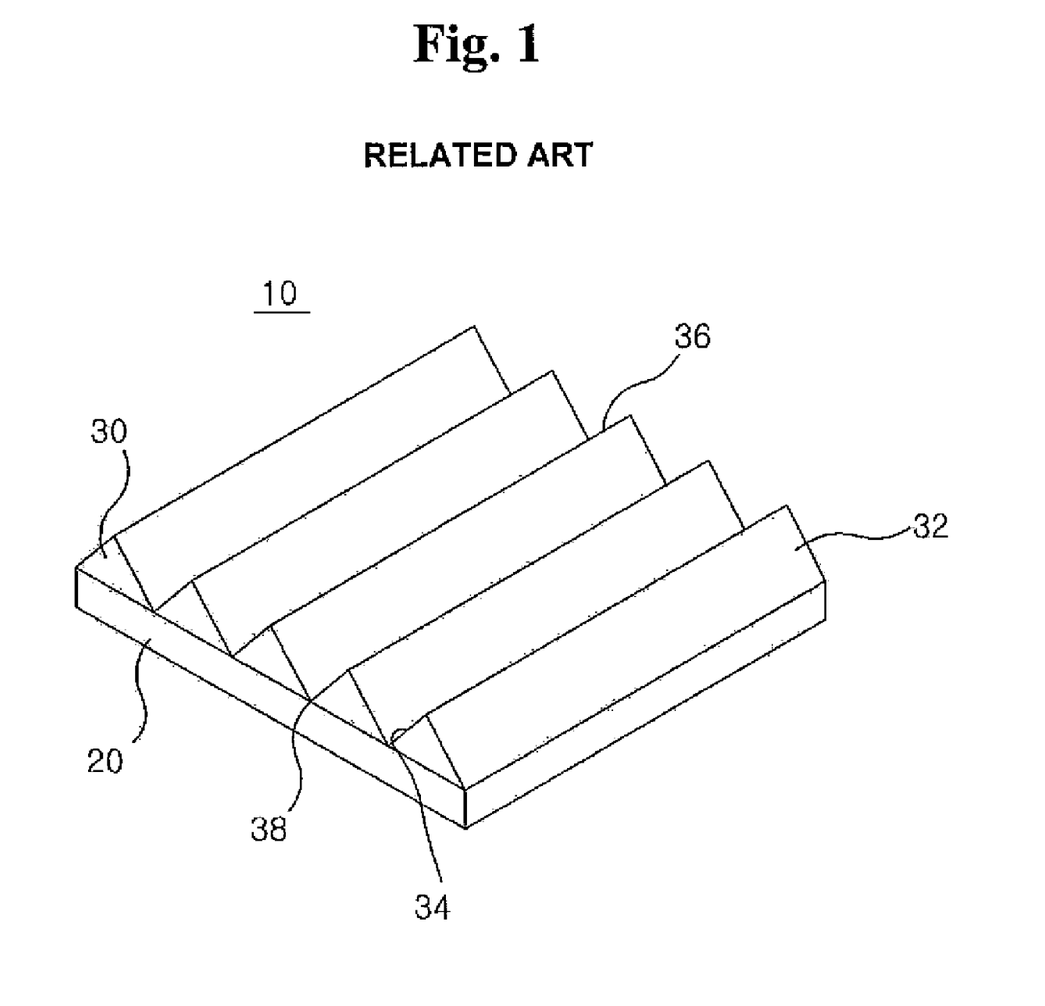
FIG. 1 is a perspective view of the prism sheet according to the related art.
Figure 2:
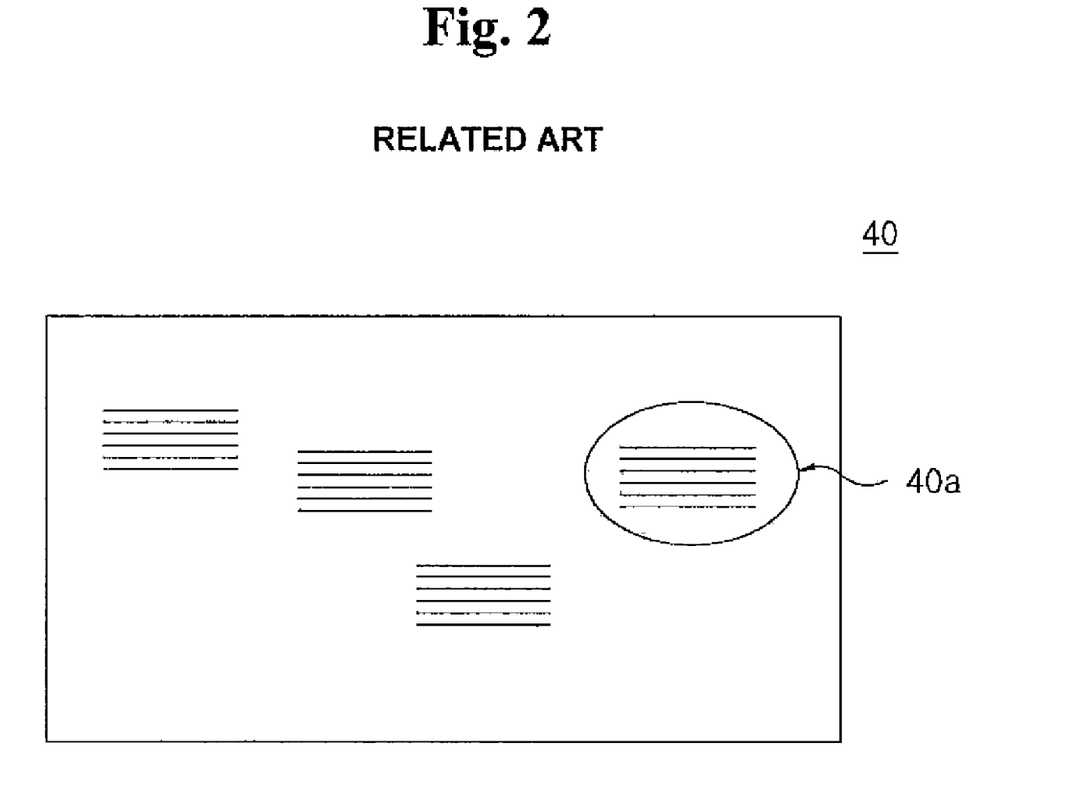
FIG. 2 is a sectional view showing a display state of a liquid crystal panel when the prism sheet in FIG. 1 is used.

FIG. 1 is a perspective view of the prism sheet according to the related art, and FIG. 2 is a sectional view showing a display state of the liquid crystal panel when the prism sheet in FIG. 1 is used.

With reference to FIG. 1, the prism sheet 10 comprises a prism support unit 20 and a plurality of prism configuration parts 30 formed side by side on the entire surface of the prism support unit 20.

The prism configuration parts 30 comprise side parts each with a first side 32 and a second side 34 and substantially having an equilateral triangular shape when viewed from the front side. The angle between the first and second sides 32 and 34 is generally 90°, and may vary according to a selection.

As the plurality of prism configuration parts 30 are continuously formed on the prism support unit 20, there are formed valleys 38 and peaks 36 alternately. Light made incident on the prism support unit 20 of the thusly constructed prism sheet 10, it is refracted while passing through the prism configuration parts 30. Accordingly, the light made incident at the low angle is concentrated toward the front side, enhancing luminance within the range of an effective viewing angle.

However, when the prism configuration parts 30 of the related art prism sheet 10 contact with a smooth surface of a different optical film, traces remain on one surface of the optical film according to the configuration of the peaks 36 of the prism configuration parts 30, causing a wet-out phenomenon that the optical film is damaged, which results in appearance of bright lines 40a that a corresponding portion is seen brighter than a peripheral portion when viewed from an outer side of the liquid crystal panel 40.

In addition, when the wet-out phenomenon occurs as the prism configuration parts 30 contact with the different optical film, the configuration of the peaks 36 may be deformed because the peaks 36 come in contact with the optical film.

Moreover, the screen display capability deteriorates because a moiré phenomenon occurs due to interference of periodical patterns between pixels constituting the liquid crystal panel 40 and the prism configuration parts 30 of the prism sheet 10 and also because of a Newton's ring phenomenon.

SUMMARY OF THE DISCLOSURE

An aspect of this document is to provide an optical film capable of reducing or removing a wet-out phenomenon, reducing the probability that a prism configuration part is deformed, and reducing or removing a moiré phenomenon and Newton's ring phenomenon, and a backlight unit having the same.

In one aspect, an optical film comprises a base film and a first prism disposed on the base film, the first prism having a first peak height and a second prism disposed on the base film, the second prism having a second peak height. A difference between the first peak height and the second peak height is substantially 1 μm to 10 μm.

In another aspect, an optical film comprises a base film and a plurality of prisms disposed on the base film. And an average horizontal amplitude of the peak of the prism is substantially 1 μm to 10 μm.

In still another aspect an optical film comprises a base film and a plurality of prisms disposed on the base film. And an average horizontal wavelength of valleys of the prisms is substantially 100 μm to 500 μm.

In still another aspect, a backlight unit comprises a light source and an optical film on which light emitted from the light source is incident. And the optical film includes a base film and a first prism disposed on the base film, the first prism having a first height and a second prism disposed on the base film, the second prism having a second height. And a difference between the first peak height of the first prism and the peak height of the second prism is substantially 1 μm to 10 μm.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention. In the drawings.

DETAILED DESCRIPTION OF EMBODIMENTS

Reference will now be made in detail embodiments of the invention examples of which are illustrated in the accompanying drawings.

The detailed exemplary embodiments of the present invention will now be described with reference to the accompanying drawings.

Figure 3:
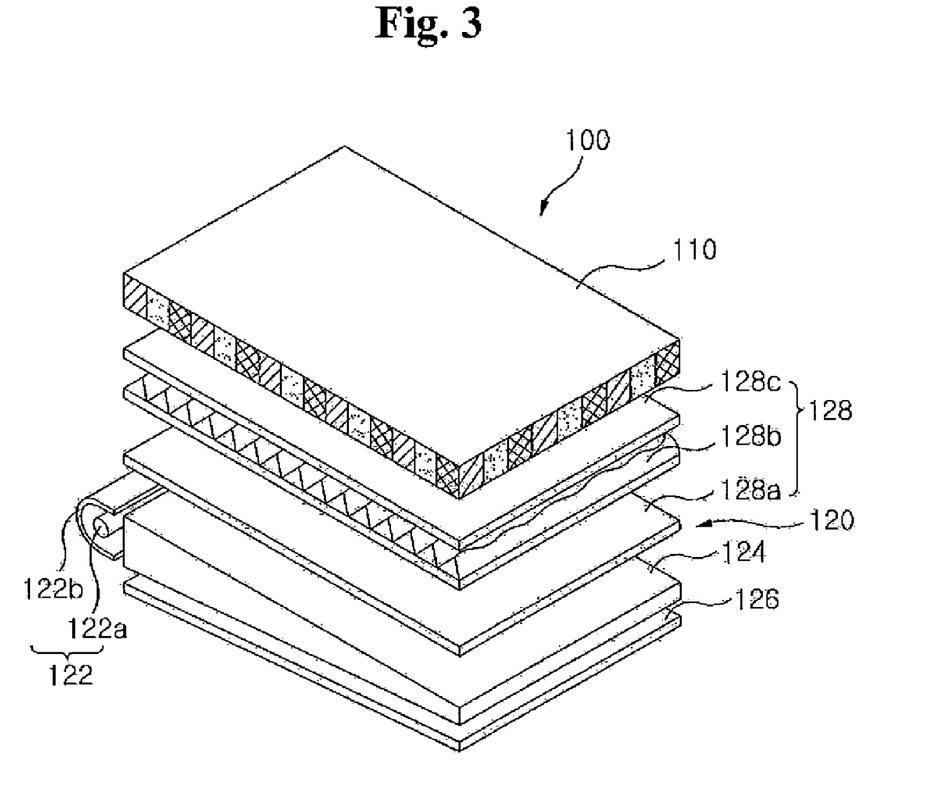
FIG. 3 is a perspective view showing a liquid crystal display (LCD) according to one exemplary embodiment to which this document is applied.
Figure 4:
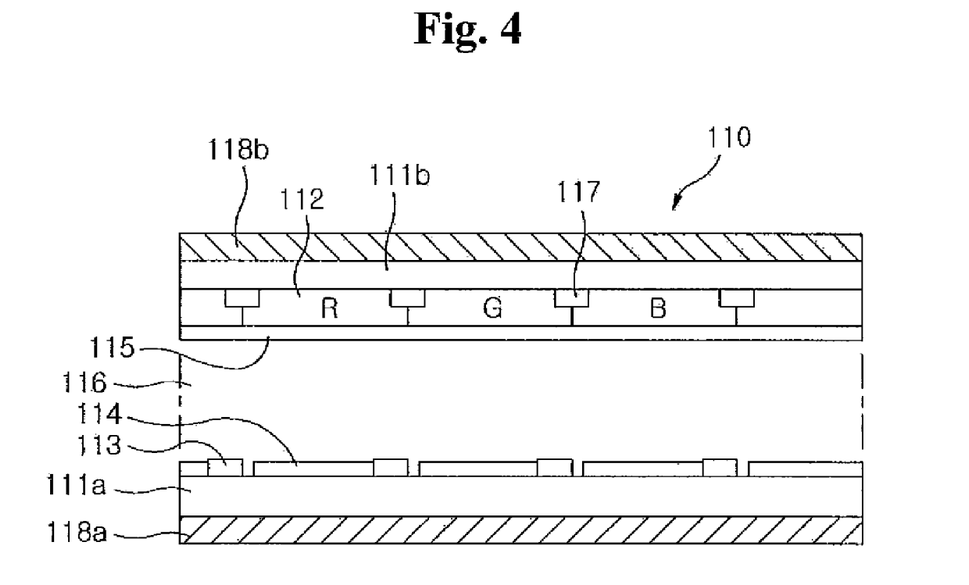
FIG. 4 is a sectional view showing a liquid crystal panel in FIG. 3.

FIG. 3 is a perspective view showing a liquid crystal display (LCD) according to one exemplary embodiment to which this document is applied, and FIG. 4 is a sectional view showing a liquid crystal panel in FIG. 3.

With reference to FIGS. 3 and 4, a liquid crystal display (LCD) 100 comprises a liquid crystal panel 110 that displays an image according to a drive signal and a data signal applied from an external source, and a backlight unit 120 disposed on a rear surface of the liquid crystal panel 110 in order to illuminate the liquid crystal panel 110.

The liquid crystal panel 110 comprises an upper substrate 111b, a lower substrate 111a, color filters 112, black matrixes 117, pixel electrodes 114, common electrodes 115, a liquid crystal layer 116, and TFT arrays 113. A pair of polarizers 118a and 118b are disposed on both side of the liquid crystal panel 110.

The color filters 112 comprise a plurality of pixels each comprising red, green and blue subpixels, and when light is applied thereto, the color filters generate an image corresponding to the red, green or blue.

In general, the pixels comprise the red, green, and blue subpixels, respectively, but without being limited thereto, red, green, blue, and white subpixels may constitute a single pixel and there may be various combinations.

The TFT arrays 113, switching elements, switch the pixel electrodes 114.

The common electrodes 115 and the pixel electrodes 114 change an arrangement of molecules of the liquid crystal layer 116 according to a certain voltage applied from the exterior.

The liquid crystal layer 116 comprises a plurality of liquid crystal molecules, and the arrangement of the liquid crystal molecules changes according to a voltage difference generated between the pixel electrodes 114 and the common electrodes 115. Light provided from the backlight unit 120 is made incident on the color filters 112 according to the change in the arrangement of the molecules of the liquid crystal layer 116.

The backlight unit 120 is positioned on a rear surface of the liquid crystal panel 110 and provides light, e.g., white light, to the liquid crystal panel 110.

The backlight unit 120 may be divided into a direct type backlight unit in which a lamp is positioned below the liquid crystal panel and an edge-light type backlight unit in which a lamp is positioned at the side of a light guide plate, depending on an optical light (e.g., a CCFL (Cold Cathode Fluorescent Lamp)) installation method.

With reference to FIG. 3, the backlight unit 120 is driven according to an edge-light method, and comprises a light source unit 122, a light guide plate 124, a reflection sheet 126, and an optical film 128.

The light source unit 122 is positioned at the side of the backlight unit 120, and comprises a light source 122a and a lamp housing 122b.

As the light source 122a, the CCFL, which provides very bright white light, may be used.

Besides the CCFL, a light emitting diode (LED) or an external electric fluorescent lamp (EEFL) may be used as the light source 122a.

The LED may be formed with the red, green, or blue color or may be formed with a single color of white light. In case of the backlight unit 120 using the LED as the light source, the backlight unit 120 can become compact, light efficiency can be improved, and light uniformity can be maintained.

The EEFL has excellent luminance compared with the CCFL and is advantageous for being operated in parallel because its electrode exists outside. In particular, the EEFL can reduce the number of inverters compared with those required for the related art light source, so a unit cost based on the components and the weight of the LCD module can be reduced.

The lamp housing 122b allows the light source 122a to be mounted thereon and allows light emitted from the light source 122a to be made incident on the side of the light guide plate 124, to thus enhance light efficiency. For this purpose, the lamp housing 122b is made of a material with high reflexibility and silver (Ag) may be coated on its surface.

The reflection sheet 126 is positioned below the light guide plate 124 and serves to reflect light emitted from the light source 122a toward the entire surface of the light guide plate 124.

The light guide plate 124 is designed such that after light is made incident on the side, total reflection is continuously made at below a threshold angle. Because the light source 122a is positioned at the side of the backlight unit 120, the light generated from the light source 122a is not uniformly on the entire surface of the backlight unit 120 but concentrated into the edge portions.

Thus, in order to uniformly transmit light to the entire surface, the light guide plate 124 is required. The light guide plate 124 is typically made of a transparent acrylic resin such as poly methyl meta acrylate (PMMA). The PMMA has high strength, which thus is not easily broken or deformed, is light, and has a high visible ray transmittance.

The light guide plate 124 allows light to proceed toward the liquid crystal panel 110.

The optical film 128 may comprise, for example, a diffusion sheet 128a, a prism sheet 128b, and a protection sheet 128c.

Light outputted toward the liquid crystal panel 110 from the light guide plate 124 passes through the diffusion sheet 128a. The diffusion sheet 128a distributes the light made incident from the light guide plate 124, preventing the light from being partially concentrated, making luminance uniform, and widening a viewing angle.

When the light passes through the diffusion sheet 128a, its luminance sharply degrades. Thus, in order to prevent the degradation of luminance, the prism sheet 128b is used. The prism sheet 128b collects a portion of light diffused or collected by the diffusion sheet 128a toward the protection sheet 128c and reflects the remaining portion of the light toward the diffusion sheet 128a. The detailed construction of the prism sheet 128b will be described later.

The protection sheet 128c is positioned on the prism sheet 128b, prevents generation of scars on the prism sheet 128b, and widens the viewing angle which has been reduced by the prism sheet 128b.

Meanwhile, besides the above-described edge-light type backlight unit, light can be provided to the liquid crystal panel by using the direct type backlight unit.

Figure 5:
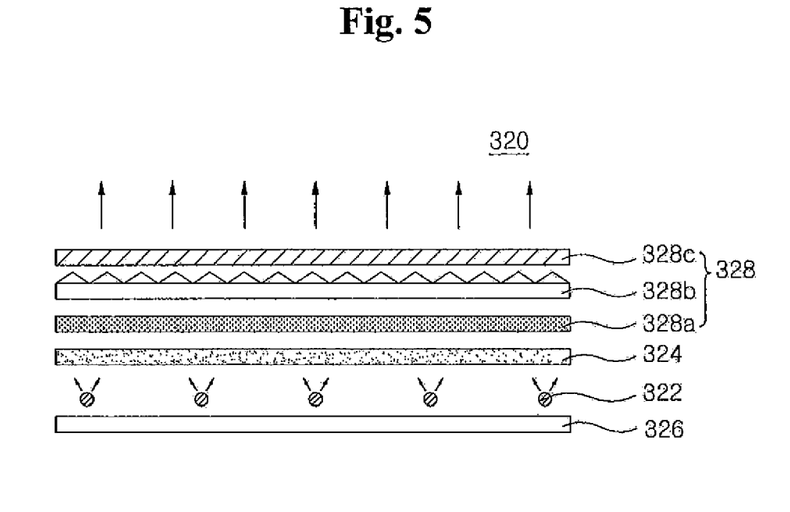
FIG. 5 is a sectional view showing a backlight unit according another exemplary embodiment to which this document is applied.

FIG. 5 is a sectional view showing a backlight unit according another exemplary embodiment to which this document is applied.

With reference to FIG. 5, the backlight unit 320 is driven according to the direct light method and comprises a light source 322, a diffusion plate 324, a reflection sheet 326, and an optical film 328.

The light source 322 is formed as a plurality of CCFLs aggregate. The CCFLs provide very bright white light.

Besides the CCFLs, the LCD or the EEFL may be used as the light source 322.

The reflection sheet 326 is positioned at a lower side of the diffusion plate 324 and serves to reflect light emitted from the light source 322 toward the front surface of the diffusion plate 324.

Meanwhile, instead of the reflection sheet 326, a light source reflection plate (not shown) may be positioned at a lower side of the light source 322, the light source 322 may be mounted thereon, and light emitted from the light source 322 is made incident on the diffusion sheet 328a, thus improving light efficiency. The light source reflection plate is made of a material with high reflexibility and silver (Ag) may be coated thereon.

The diffusion plate 324 allows light made incident from the light source 322 to pass therethrough. Preferably, the diffusion plate 324 is made of PMMA.

The optical film 328 may comprise, for example, a diffusion sheet 328a, a prism sheet 328b, and a protection sheet 328c.

The light outputted toward the liquid crystal panel 110 from the diffusion plate 324 passes through the diffusion sheet 328a. The diffusion sheet 328a distributes the light made incident from the diffusion plate 324, preventing the light from being partially concentrated and making luminance uniform.

When the light passes through the diffusion sheet 328a, its luminance sharply degrades. Thus, in order to prevent the degradation of luminance, the prism sheet 328b is used. The prism sheet 328b collects a portion of light diffused or collected by the diffusion sheet 328a toward the protection sheet 328c and reflects the remaining portion of the light toward the diffusion sheet 328a. The detailed construction of the prism sheet 328b will be described later.

The protection sheet 328c is positioned on the prism sheet 328b, prevents generation of scars on the prism sheet 328b and widens the viewing angle which has been reduced by the prism sheet 328b.

The illumination operation of the LCD 100 will now be described.

With reference to FIG. 4, the backlight units 120 and 320 provide a plane light, white light, to the liquid crystal panel 110.

Subsequently, the TFT arrays 113 switch the pixel electrodes 114.

Successively, a certain voltage difference is applied between the pixel electrodes 114 and the common electrodes 115, as accordingly, the liquid crystal layer 116 is arranged to correspond to the red subpixels, the green subpixels, and the blue subpixels.

In this case, when the light provided from the backlight units 120 and 320 passes through the liquid crystal layer 116, the quantity of light is controlled, and the quantity-controlled light is provided to the color filters 112.

As a result, the color filters 112 implement an image with certain gray scales.

In detail, the pixels comprising the red subpixels, the green subpixels, and the blue subpixels implement a certain image according to combination of light which has passed through the red subpixels, the green subpixels, and the blue subpixels.

The optical films 128 and 328, in particular, the prism of the prism sheets 128b and 328b, will be described as follows.

Figure 6:
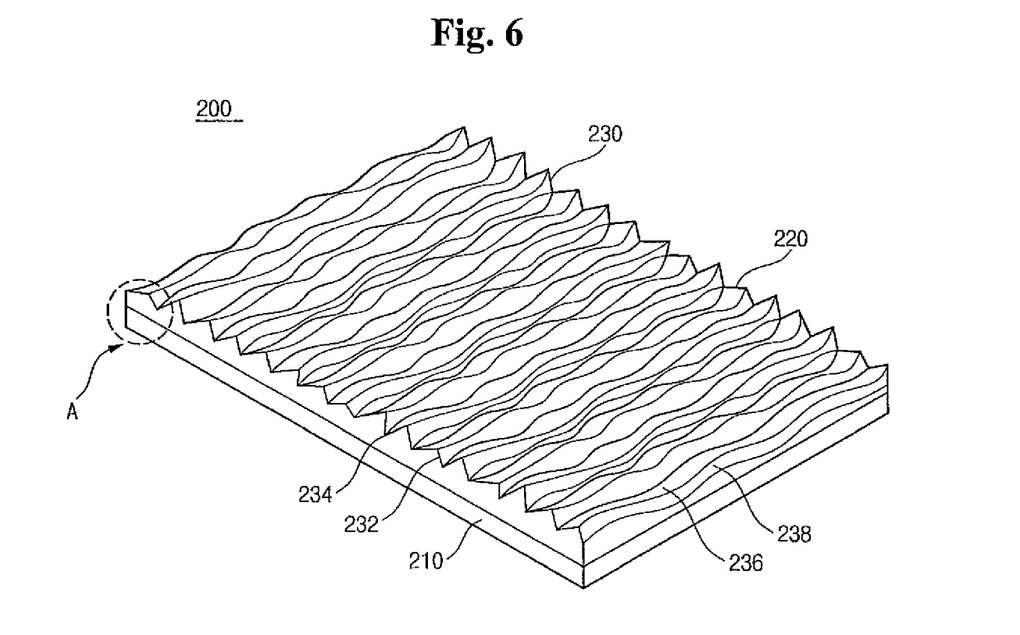
FIG. 6 is a perspective view showing the prism of an optical film according to one exemplary embodiment to which this document is applied.

FIG. 6 is a perspective view showing the prism of an optical film according to one exemplary embodiment to which this document is applied.

Figure 7A:
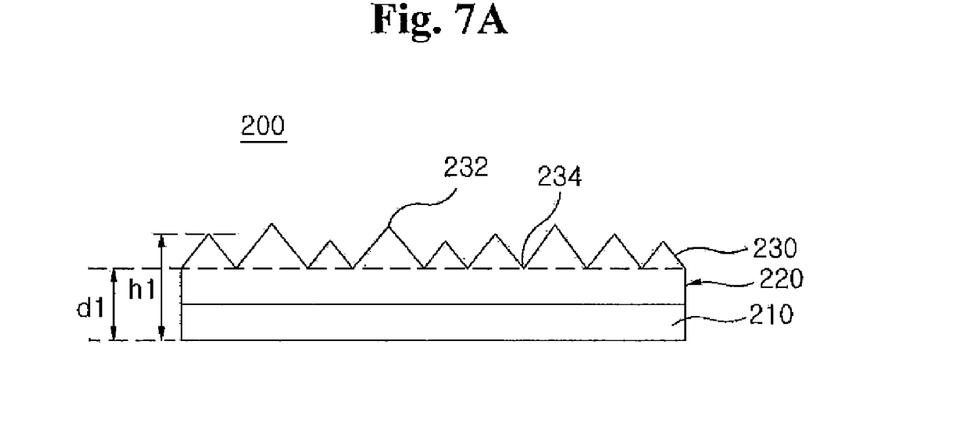
FIG. 7A is a front view of the optical film in FIG. 6.
Figure 7B:
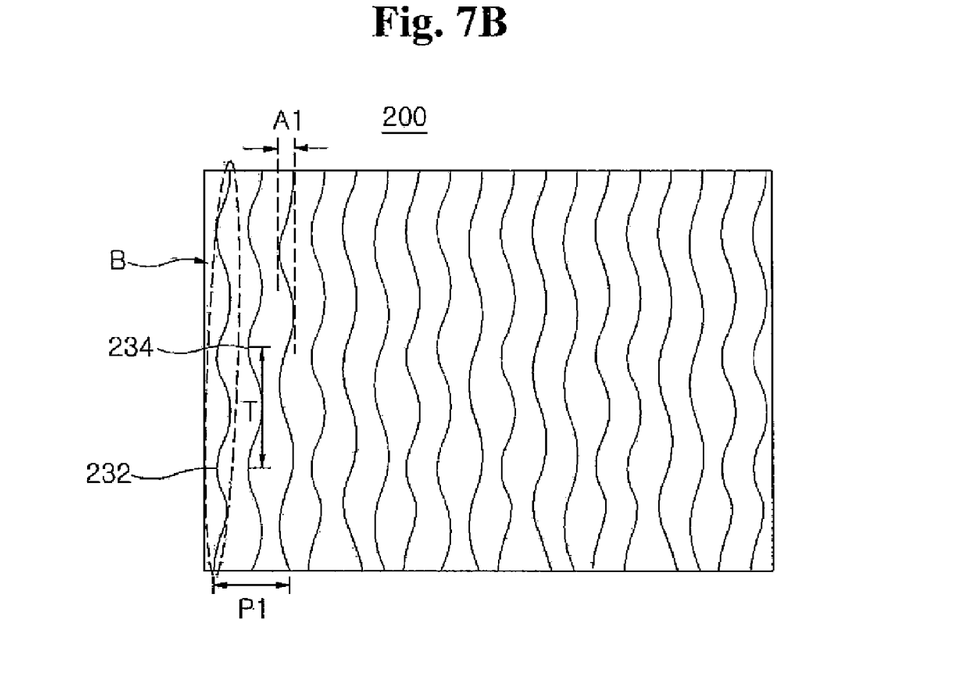
FIG. 7B is a plan view of the optical film in FIG. 6.
Figure 7C:
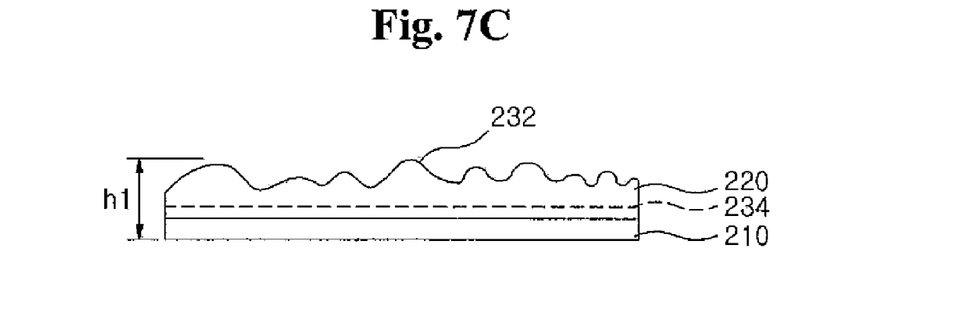
FIG. 7C is a side view of a portion 'B' in FIG. 7B.
Figure 7D:
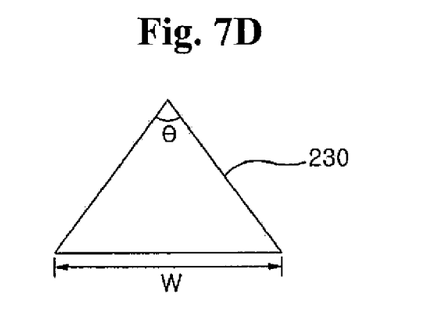
FIG. 7D is a front view of a portion 'A' of the optical film in FIG. 6.
Figure 8A:
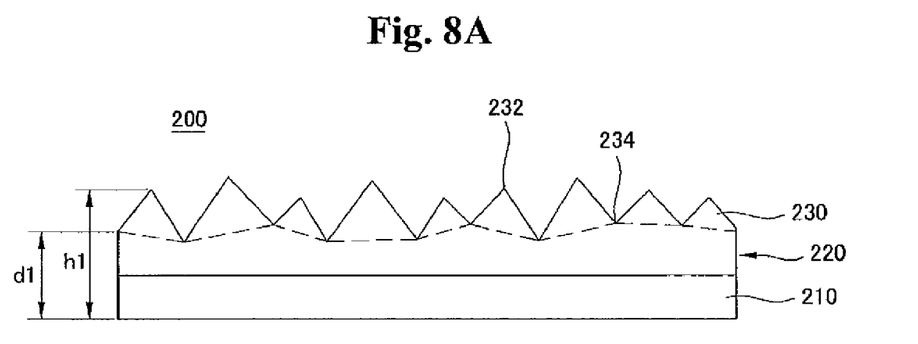
FIG. 8A is another front view of the optical film in FIG. 6.
Figure 8B:
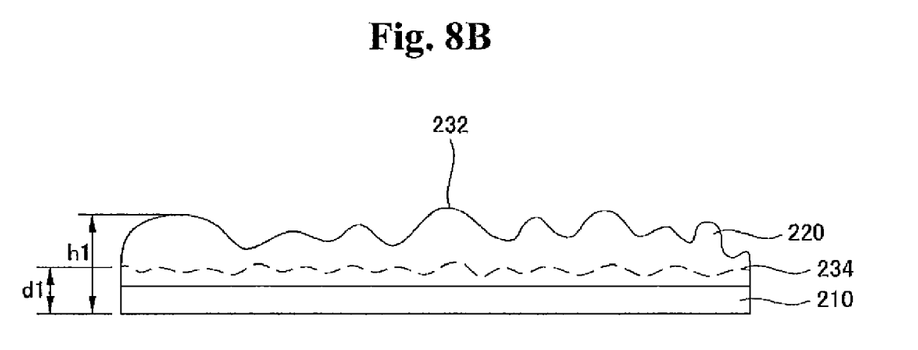
FIG. 8B is a side view of a portion 'B' in FIG. 7B.

FIG. 7A and FIG. 8A are front view of the optical film in FIG. 6, FIG. 7B is a plan view of the optical film in FIG. 6, FIG. 7C and FIG. 8B are side view of a portion 'B' in FIG. 7B, and FIG. 7D is a front view of a portion 'A' of the optical film in FIG. 6.

With reference to FIG. 6, the optical film 200 according to the exemplary embodiment of the present invention, for example, the prism sheets 128b and 328b, comprises a base film 210 and a plurality of prisms 220 formed on the base film 210. The plurality of prisms 220 comprises each prism 230 and each prism 230 is formed in a row to constitute the plurality of prisms 220.

One side of the optical film 200 is structured as the plurality of prisms 220 while the opposite side thereof is the base film 210 which is smoothly formed.

The base film 210 is preferably made of a thermoplastic polymer film which is transparent and flexible and has good processibility.

The plurality of prisms 220 are disposed side by side on the entire surface of the base film 210 and the peaks 232 and the valleys 234 of each prism 230 form continuous curved surface. The continuous curved surface formed by the peaks 232 and the valleys 234 of each prism 230 are randomly formed.

The side portions 236 and 238 of each prism 230 are also bent.

In detail, with reference to FIG. 7A, the height dl of the valley 234 of each prism 230 is uniform while the height h1 of the peaks 232 may change randomly.

On the contrary, with reference to FIG. 8B, the height dl of the valley 234 of each prism 230 and the height h1 of the peaks 232 may change randomly.

Namely, the difference between the height h1 of a peak 232 of one prism 230 among the plurality of prisms 220 and the height h1 of a peak of another prism may be within the range of about 1 μm to 10 μm, and preferably, the difference may be within the range of about 1 μm to 3 μm.

Herein, the peak height refers to the height of the peak.

With reference to FIG. 7B, the distance Pl between the peaks 232 of the plurality of prisms 220 changes randomly. In addition, the left and right of the peak 232 of each prism 230 has a certain variation, and a horizontal average amplitude A1 of the peak 232 of each prism 230 vibrates within the range of about 1 μm to 10 μm.

The left and right variation of the valley 234 is random with a wavelength (T) of substantially 100 μm to 500 μm.

With reference to FIG. 7C, when the peak 232 of each prism 230 formed at one line of the plurality of prisms 220 is observed from the side, the height h1 of the peak 232 from the bottom changes randomly. Namely, the height h1 of the peak 232 of each prism 230 may change randomly.

On the contrary, with reference to FIG. 8B, when the peak 232 of each prism 230 formed at one line of the plurality of prisms 220 is observed from the side, the height h1 of the peak 232 and the height d1 of the valley 234 from the bottom changes randomly.

That is, the difference between heights h1 of the peaks 232 within each prism 230 may be within the range of about 1 μm to 10 μm, and preferably, within the range of about 1 μm to 3 μm.

Unlike the height of the peaks 232, the height of the valleys 234 may be formed to be uniform.

With reference to FIG. 7D, one section of the prism 230 may have a substantially triangular shape. The length (W) of the bottom side of the prism 230 is within the range of about 20 μm to 300 μm, and a vertical angle (θ) of the prism 230 may have a value within the range of about 60° to 120°. Preferably, the one section of the prism 230 has a shape of the right-angled equilateral triangle. As for the prism 230, both sides, excluding the bottom side, may be formed as a curved surface.

Figure 9:
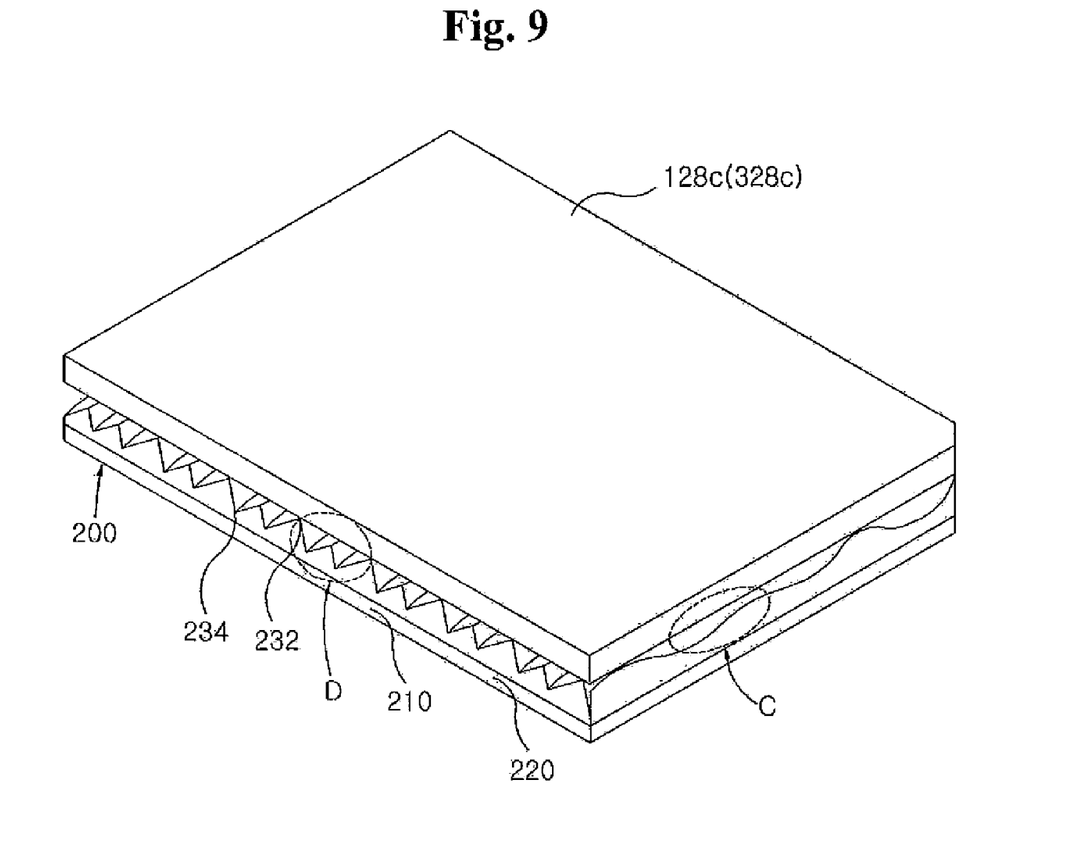
FIG. 9 is a perspective view showing a disposition state of the optical film in use for a backlight unit according to one exemplary embodiment of the present invention.

FIG. 9 is a perspective view showing a disposition state of the optical film in use for a backlight unit according to one exemplary embodiment of the present invention.

In this manner, the height of the peaks 232 of the plurality of prisms 220 of the optical film 200 changes randomly and the horizontal amplitude of the peaks 232 also changes randomly.

Accordingly, as shown in FIG. 9, although the optical film 200 contacts physically with a different upper optical sheet, e.g., the protection sheets 128c and 328c, the peaks 232 of the plurality of prisms 220 can be prevented from being entirely deformed, and thus, when the optical film 200 is employed for the backlight, the picture quality of the LCD is not affected.

In addition, because the height of the peaks 232 of the plurality of prisms 220 of the optical film 200 changes randomly, as shown by the contact states of the regions 'C' and 'D' in FIG. 9, the physical contact areas are reduced between the optical film 200 and the different upper optical sheet, e.g., the protection sheets 128c and 328c, a wet-out phenomenon can be reduced or removed, so a defect cannot be easily detected visually.

Thus, because the optical film 200 according to one exemplary embodiment of the present invention has the random pattern, a moiré phenomenon or a Newton's ring phenomenon can be reduce or removed.

The characteristics of the optical film 200 according to the exemplary embodiment of the present invention will now be described in detail.

TABLE 1

|  | Horizontal average amplitude | Average wavelength (T) | Height difference of peaks |
|---|---|---|---|
| Embodiment 1 | 2 μm | 150 μm | 1.5 μm |
| Embodiment 2 | 4 μm | 200 μm | 2 μm |
| Embodiment 3 | 1 μm | 120 μm | 1 μm |
| Embodiment 4 | 5 μm | 300 μm | 3 μm |

With reference to FIG. 1, in Embodiment 1, the horizontal average amplitude A1 of the peak of the prism is 2 μm, the average wavelength (T) of the valley is 150 μm, and the height difference h1 of the peaks is 1.5 μm.

In Embodiment 2, the horizontal average amplitude A1 of the peak of the prism is 4 μm, the average wavelength (T) of the valley is 200 μm, and the height difference h1 of the peaks is 2 μm.

In Embodiment 3, the horizontal average amplitude A1 of the peak of the prism is 1 μm, the average wavelength (T) of the valley is 120 μm, and the height difference h1 of the peaks is 1 μm.

In Embodiment 4, the horizontal average amplitude A1 of the peak of the prism is 5 μm, the average wavelength (T) of the valley is 300 μm, and the height difference h1 of the peaks is 3 μm.

All the prisms of the Embodiment 1 to Embodiment 4 have the bottom side with the length of 50 μm average and have the shape of the right-angled equilateral triangle with the vertical angle of 90°.

The backlight unit was fabricated by using the optical films according to the Embodiment 1 to Embodiment 4, and generation of the moiré phenomenon and the wet-out phenomenon in the LCD employing the backlight unit was checked. The result is as shown below.

TABLE 2

|  | Generation of moiré phenomenon | Generation of Wet-out phenomenon |
|---|---|---|
| Embodiment 1 | No | Within tolerance |
| Embodiment 2 | No | Within tolerance |
| Embodiment 3 | No | Within tolerance |
| Embodiment 4 | No | Within tolerance |

The wet-out phenomenon and the moiré phenomenon was checked such that whether a defect of the optical film was visually detected or not from the screen of the LCD and whether each phenomenon occurred or not, and whether there is a defect or not was checked based on the average eyesight of general persons.

According to the determination, as shown in [Table 2], the optical films according to Embodiment 1 to Embodiment 4 showed the wet-out phenomenon within the range of tolerance, and thus, any visual external defect was not detected. In addition, the moiré phenomenon did not occur.

Consequently, because the optical film according to the exemplary embodiment of the present invention has the random pattern, the moiré phenomenon or the Newton's ring phenomenon can be reduced or removed, and the likelihood of deformation of the plurality of prisms can be reduced.

In addition, because the peaks of the prisms have each different height, the contact area between the optical film and other optical sheets can be reduced, and thus, a defect can be hardly detected visually from outside and the wet-out phenomenon can be reduced or removed.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An optical film, comprising:
  a base film; and
  a plurality of prisms disposed on the base film,
  wherein at least one of the plurality of prisms comprises a continuous curved surface along a longitudinal direction of the at least one of the plurality of prisms, an average horizontal wavelength of valleys of the plurality of prisms is substantially 100 μm to 500 μm, an average horizontal amplitude of the peaks of the plurality of prisms is substantially 1 μm, to 10 μm, peak heights of the plurality of prisms vary along a longitudinal direction of the plurality of prisms, and the plurality of prisms comprise a first prism and a second prism, and a difference between a peak height of the first prism and a peak height of the second prism is substantially 1 μm to 10 μm.

2. The optical film of claim 1, wherein the valleys between the plurality of prisms are disposed on a same surface.

3. A backlight unit, comprising:

a light source; and an optical film on which light emitted from the light source is incident, the optical film, including:

a base film; and a plurality of prisms disposed on the base film, wherein at least one of the plurality of prisms comprises a continuous curved surface along a longitudinal direction of the at least one of the plurality of prisms, an average horizontal wavelength of valleys of the plurality of prisms is substantially 100 μm to 500 μm, an average horizontal amplitude of the peaks of the plurality of prisms is substantially 1 μm to 10 μm, peak heights of the plurality of prisms vary along a longitudinal direction of the plurality of prisms, and the plurality of prisms comprise a first prism and a second prism, and a difference between a peak height of the first prism and a peak height of the second prism is substantially 1 μm to 10 μm.

4. The backlight unit of claim 3, wherein the valleys between the plurality of prisms are disposed on a same surface.

* * * * *